March 11, 1930.  B. H. BROWALL  1,750,566
BRAKE RIGGING FOR RAILWAY CARS AND THE LIKE
Filed Dec. 23, 1927  2 Sheets-Sheet 1

Inventor:
B. H. Browall,
By Langner, Parry, Card & Langner
Attys

March 11, 1930.  B. H. BROWALL  1,750,566

BRAKE RIGGING FOR RAILWAY CARS AND THE LIKE

Filed Dec. 23, 1927  2 Sheets-Sheet 2

Inventor:
B. H. Browall.

Patented Mar. 11, 1930

1,750,566

UNITED STATES PATENT OFFICE

BERT HENRY BROWALL, OF MALMO, SWEDEN, ASSIGNOR TO SVENSKA AKTIEBOLAGET BROMSREGULATOR, OF MALMO, SWEDEN, A CORPORATION OF SWEDEN

BRAKE RIGGING FOR RAILWAY CARS AND THE LIKE

Application filed December 23, 1927, Serial No. 242,195, and in Germany February 24, 1927.

The present invention refers to an improvement in brake riggings for railway cars and the like and has for its object to make it possible to mount an automatic slack adjuster in the brake rigging especially in railway cars or the like, in which the axle base is very small and wherein the construction of the under-frame of the car does not permit a normal mounting of the automatic slack adjuster in the pull rod connecting the brake cylinder lever with the crank levers on the brake shafts. According to the invention it will be possible to mount the automatic slack adjuster in the brake rigging without any alteration of the position of the brake cylinder and the pull rods already mounted or of the brake rigging in general, this possibility being obtained in case, for instance, of common single-chamber air brakes, either by using a third brake lever and by an elongation or shortening of one of the brake levers already at hand, or in case, for instance, of brakes already provided with a third brake lever by an elongation or shortening of one or more such levers already at hand, so that one of the pull rods may be given a greater length as thereby to enable the arrangement of the automatic slack adjuster as a part of the rod thus elongated.

Figure 1:
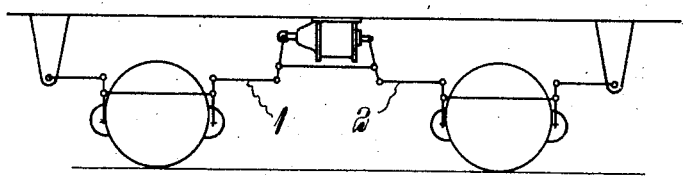
Figure 3:
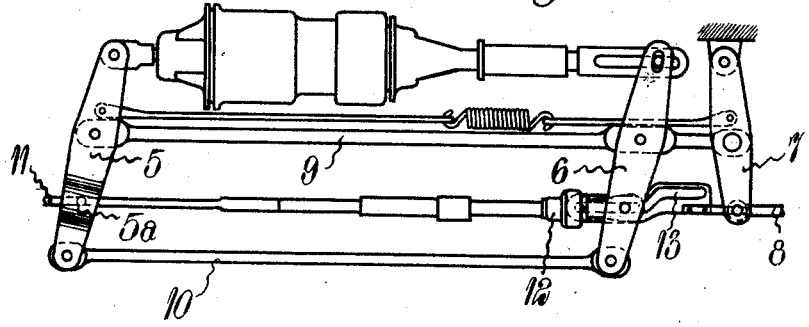
Figure 4:
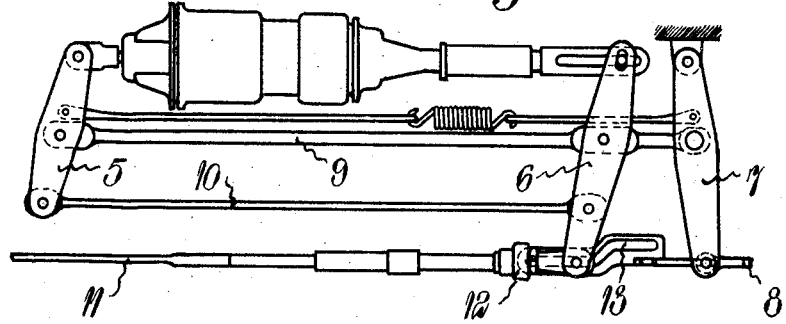
Figure 5:
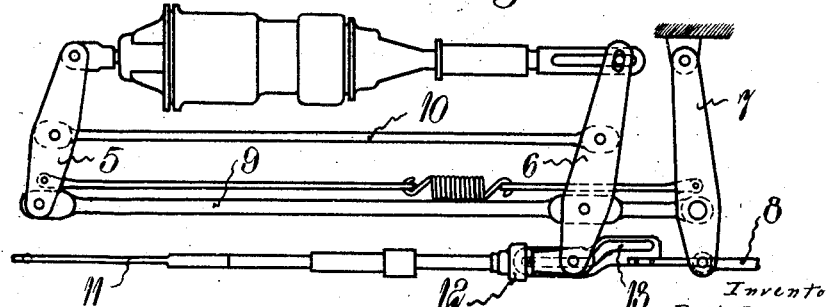

In the following the invention is to be described with reference to the accompanying drawings showing a number of different embodiments thereof. In the drawings Fig. 1 diagrammatically shows a brake rigging for the common single-chamber air brake and Fig. 2 in the same manner shows a brake rigging provided with an intermediate or third brake lever. Figs. 3–5 show three different embodiments of the invention applied to the brake rigging shown in Fig. 2, and Figs. 6–8 show the same number of embodiments of the invention applied to the brake rigging according to Fig. 1.

Figure 6:
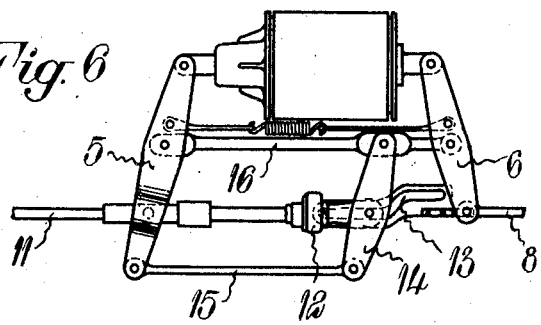
Figure 7:
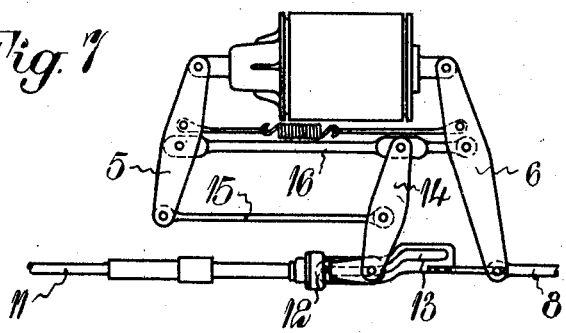
Figure 8:
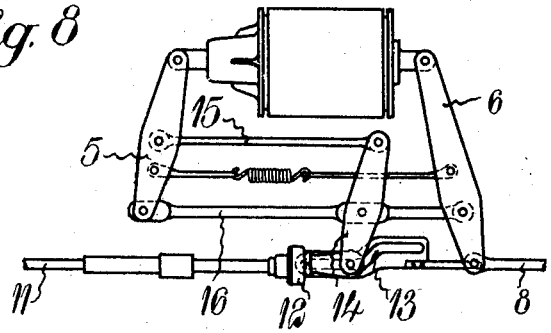

In all of the Figures 6–8 the automatic slack adjuster is mounted in the pull rod extending to the left, but it will be obvious to anyone skilled in the art that the slack adjuster could as well have been mounted, although in a reverse position, in the pull rod extending to the right. Further it is to be noted that for the matter of simplicity the actuating means for obtaining the adjusting movement is shown in the form of a slotted link provided with an inclining surface, but as far as the invention is concerned it is indifferent whether said means are carried out in one form or another, and other means may as well serve the same purpose the main point being that an adjusting movement is obtained by the axial displacement of the rod during the braking operation.

Figure 2:
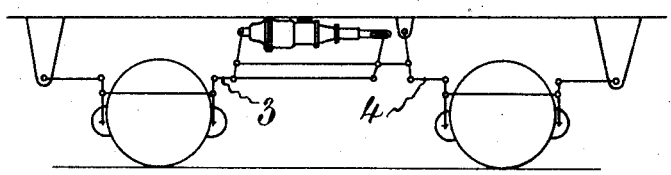

In the following it is to be assumed that the pull rods 1 and 2 according to Fig. 1 and the corresponding rods 3 and 4 according to Fig. 2, due to the small axle base, are too short for permitting the mounting of a satisfactorily working automatic slack adjuster as a part of the same. The mounting of such slack adjuster outside of the axle base may perhaps be proposed, if end pull rods are at hand and can be given a sufficient length, but the position of the last or outermost brake block lever in the brake rigging would then be disadvantageously inclined and frequently such inclination will not be permissible or obtainable in brake riggings of the conventional type. This drawback may, of course, be in part avoided by mounting an automatic slack adjuster in each of the last or outermost brake pull rods, but thereby the construction would be so considerable complicated and so much more clostly that this solution of the problem should not be resorted to, if possible. It may also be proposed to mount the automatic slack adjuster in the intermediate pull rod between the brake cylinder levers according to Fig. 1, but since also the return spring is usually mounted between these levers (compare Figs. 6–8) and since said spring according to the adjustment would thus be released (or further compressed in case it was carried out in the form of a compression spring arranged at the opposite side of the pull rod) an arrangement of this kind would also be objectionable.

In order to obtain a satisfactory solution of the problem the brake cylinder levers according to the invention are somewhat altered in order to make it possible to elongate one of the pull rods 1, 2 or 3 for the purpose of mounting the automatic slack adjuster as a part of the same.

According to Fig. 3 the brake cylinder levers 5 and 6 are usually of the same length as the lever 7, but instead of the same the longer levers 5 and 6 shown in the figure are used according to the invention. The right hand pull rod 8 and the rod 9 connecting the levers 5, 6 and 7 are left unaltered as before and the rod 10 connecting the levers 5 and 6 is pivotally connected to the extended ends of said levers. Instead of the left hand pull rod 11, but without alteration of the position of the same, a longer pull rod is used in which the automatic slack adjuster 12 is mounted, such rod being, however, pivotally connected with the lever 6. Since now both of the levers 5 and 6, on account of the connecting rods 9 and 10, move in parallel with each other the connection of the slack adjuster and the left hand pull rod 11 with the right hand lever 6 instead of the lever 5 is of no influence on the satisfactory working of the brake in itself. The left hand lever 5 is also provided with a knee 5ª in order not to interfere with the free movement of the pull rod 11, which thus may remain in the same position as before. For obtaining the proper adjusting movement the lever 7 is provided with, for instance, a cam member or slotted link 13 forming an inclined surface and intended for straddling the end of an arm, the other end of which is pivoted around a pin on the lever 6, said arm being also connected with the actuating means of the automatic slack adjuster 12.—Since the manner of operation of an automatic slack adjuster of this kind is commonly known per se and since the construction of said slack adjuster forms no part of the invention it is not specifically shown in the drawing and it would be superfluous to more fully describe the same in this connection.

The modifications according to the Figures 4 and 5 will easily be understood from the drawing only and are due to different arrangements of the connecting rods 9 and 10 respectively. According to Fig. 4 the levers 6 and 7 and the rods 9 and 10 are left unaltered as before and the lever 5, which originally has had the same length as the levers 6 and 7 has been shortened, the pull rod 11 having been elongated in the same manner as in Fig. 3 and provided with the automatic slack adjuster 12 forming a part of the same. The modification according to Fig. 5 is similar to Fig. 4 and the position of the rods 9 and 10 (and of the return spring placed adjacent to the former) has been interchanged only.

In the modifications according to Figs. 6-8 the brake is intended to be operated by means of a single-chamber air brake cylinder of common type and the third lever is not at hand in the brake rigging. In order to make it possible to mount the automatic slack adjuster as a part of one of the pull rods at hand in this brake rigging the latter is to be provided with a third lever 14 and a parallel connecting rod 15 for the same, the lever 14 being also pivotally connected with the connecting rod 16 between the levers 5 and 6, which connecting rod is either already at hand or may be mounted between said levers. In other respects these modifications are similar to the modifications according to Figs. 3-5.

According to Fig. 6 the lever 5 is elongated and provided with a knee 5ª, and according to Fig. 7 the lever 5 is shortened, which is also the case according to Fig. 8, although in the latter figure the position of the rods 15 and 16 is interchanged.

In all of the modifications according to Figs. 3-8 neither the position of the brake cylinder and the pull rods 8 and 11 nor that of the brake rigging in general and of the brake blocks is altered in any way and the invention makes it possible in certain cases by comparatively simple means to mount an automatic slack adjuster on the car under the conditions mentioned.

What I claim and desire to secure by Letters Patent is:—

1. A brake rigging, especially designed for use on cars having a small axle base, comprising an air brake cylinder, a brake lever having a fixed fulcrum positioned adjacent to one end of the brake cylinder, another brake lever having a floating fulcrum positioned at the opposite end of said cylinder, a third brake lever positioned intermediate the two first mentioned brake levers and also provided with a floating fulcrum, a connecting rod between all of the levers and another connecting rod between both of the levers having floating fulcrums, a pull rod connected to the lever having the fixed fulcrum, a pull rod connected to the intermediate lever, and an automatic slack adjuster interposed in this lastmentioned pull rod.

2. A brake rigging, especially designed for use on cars having a small axle base, comprising an air brake cylinder, a brake lever having a fixed fulcrum positioned adjacent to one end of said brake cylinder, another brake lever having a floating fulcrum positioned at the opposite end of the same, a third brake lever positioned intermediate the two firstmentioned brake levers and also provided with a floating fulcrum, two of said levers extending a longer distance from the axial line of the brake cylinder than the third of them, a connecting rod pivotally connected with all of said levers and another connecting rod pivotally connected with both of the levers having floating fulcrums, a pull rod pivotally connected with the lever having fixed fulcrum, another pull rod pivotally connected with the intermediate lever, and an automatic slack adjuster interposed in said lastmentioned pull rod.

3. A brake rigging, especially designed for use on cars having a small axle base, comprising an air brake cylinder, a brake lever having a fixed fulcrum positioned adjacent to one end of said cylinder, another brake lever having a floating fulcrum positioned at the opposite end of the same, a third brake lever positioned intermediate the two firstmentioned brake levers and also provided with a floating fulcrum, the said third lever and one of the other brake levers extending a longer distance from the axial line of the brake cylinder than the remaining one, a connecting rod pivotally connected with all of the levers and another connecting rod pivotally connected with both of the levers having floating fulcrums, a pull rod pivotally connected with the lever having a fixed fulcrum, another pull rod pivotally connected with the intermediate lever, and an automatic slack adjuster interposed in said lastmentioned pull rod.

4. A brake rigging, especially designed for use on cars having a small axle base, comprising an air brake cylinder, a brake lever having a fixed fulcrum positioned adjacent to one end of the brake cylinder, another brake lever having a floating fulcrum positioned at the opposite end of said cylinder, a third brake lever positioned intermediate the two firstmentioned brake levers and also provided with a floating fulcrum, two of said levers extending a longer distance from the axial line of the brake cylinder than the third of them, a connecting rod between all of the levers placed along a line substantially parallel with the axis of the brake cylinder and another connecting rod between both of the levers having floating fulcrums, the rods being substantially parallel to the firstmentioned connecting rod in order to guide the lastmentioned levers in parallel, a pull rod connected to the lever having the fixed fulcrum, another pull rod connected to the intermediate lever, and an automatic slack adjuster being interposed in said lastmentioned pull rod.

5. A brake rigging, especially designed for use on cars having a small axle base, comprising an air brake cylinder, a brake lever having a fixed fulcrum positioned adjacent to one end of said cylinder, another brake lever having a floating fulcrum positioned at the opposite end of the same, a third brake lever positioned intermediate the two firstmentioned brake levers and also provided with a floating fulcrum, the said third lever and the lever having a fixed fulcrum extending a longer distance from the axial line of the brake cylinder than the remaining one, a connecting rod pivotally connected with all of the levers and another connecting rod pivotally connected with both of the levers having floating fulcrums, a pull rod pivotally connected with the lever having fixed fulcrum, another pull rod pivotally connected with the intermediate lever, and an automatic slack adjuster interposed in said lastmentioned pull rod.

In testimony whereof I have signed my name to this specification.

BERT HENRY BROWALL.